United States Patent
Jung et al.

(10) Patent No.: US 10,197,192 B2
(45) Date of Patent: Feb. 5, 2019

(54) AVIATION ACCESS PANEL QUICK-RELEASE FASTENER POSITIONING CLIP

(71) Applicant: The Boeing Company, Chicago, IL (US)

(72) Inventors: Kevin Jung, Pacific, MO (US); Steven Jones, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/608,051

(22) Filed: May 30, 2017

(65) Prior Publication Data

US 2018/0347725 A1 Dec. 6, 2018

(51) Int. Cl.
| | |
|---|---|
| F16L 3/00 | (2006.01) |
| F16L 3/123 | (2006.01) |
| F16L 3/13 | (2006.01) |
| F16L 3/04 | (2006.01) |

(52) U.S. Cl.
CPC .............. *F16L 3/1236* (2013.01); *F16L 3/04* (2013.01); *F16L 3/13* (2013.01); *F16L 3/123* (2013.01)

(58) Field of Classification Search
CPC .............. Y10T 24/44; Y10T 24/44923; B60R 13/0206; F16L 33/03
USPC ......... 248/56, 74.2, 316.7; 24/455, 457, 486
See application file for complete search history.

(56) References Cited

U.S. PATENT DOCUMENTS

| | | | |
|---|---|---|---|
| 7,062,886 B2 * | 6/2006 | Auriemma | E04B 9/242 24/501 |
| 7,207,529 B2 * | 4/2007 | Rosemann | F16L 3/23 248/71 |
| 8,413,939 B2 * | 4/2013 | Ramsauer | E05C 9/22 248/214 |
| 8,590,225 B1 * | 11/2013 | Steel | E06B 9/00 403/DIG. 4 |
| 2002/0163184 A1 * | 11/2002 | Blair | F16B 2/26 285/114 |
| 2009/0090833 A1 * | 4/2009 | Daraz | B60R 11/0241 248/316.7 |

* cited by examiner

*Primary Examiner* — Steven M Marsh
(74) *Attorney, Agent, or Firm* — Joseph M. Rolnicki; Evans & Dixon, L.L.C.

(57) ABSTRACT

A positioning clip is removably attachable to a fastener of a quick-release fastener assembly on an access panel of an aircraft when the access panel is removed from the aircraft. The positioning clip holds the fastener in its full out position relative to the exterior surface of the access panel removed from the aircraft. The positioning clip attached to the fastener maintains the perpendicular orientation of the fastener relative to the exterior surface of the access panel and relative to the associated receptacle for the fastener on the structure of the aircraft when the access panel is reattached to the structure of the aircraft.

20 Claims, 10 Drawing Sheets

AVIATION ACCESS PANEL QUICK-RELEASE FASTENER POSITIONING CLIP

FIELD

This disclosure pertains to a positioning clip that is removably attached to a quick-release fastener on an access panel of an aircraft when the access panel is removed from the aircraft. The positioning clip holds the fastener in its full out position relative to the exterior surface of the access panel removed from the aircraft. The positioning clip attached to the fastener maintains the perpendicular orientation of the fastener relative to the exterior surface of the access panel and relative to the associated receptacle for the fastener on the structure of the aircraft when the access panel is reattached to the structure of the aircraft.

BACKGROUND

Aircraft typically have several access panels or doors that are removably attached to the exterior of the aircraft by quick-release fastener systems. A typical quick-release fastener system is comprised of fasteners that are mounted through holes in the access panel of the aircraft and receptacles for the fasteners that are secured to the interior structure of the aircraft that is covered by the access panel. When removably attaching the access panel to the aircraft, each fastener in a hole in the access panel is aligned with its associated receptacle on the interior structure on the aircraft. With a fastener aligned with its associated receptacle, rotating the fastener, for example a quarter turn or a half turn pulls the fastener down into its associated receptacle and attaches the access panel to the structure of the aircraft.

Each fastener of the quick-release fastener system has a length that is pulled into a receptacle when the fastener is releasably attached to the receptacle. When the access panel is removed from the aircraft, each fastener is free to move through its associated hole in the access panel. However, the extent to which the fastener can move through its associated hole in the access panel is limited by a head of the fastener at one end of the fastener, and a retaining ring attached to the fastener at an opposite end of the fastener. The head and retaining ring of the fastener are positioned on opposite sides of the access panel. The fastener is free to move through its associated hole in the access panel, but the head and the retaining ring at opposite ends of the fastener prevent the fastener from exiting the hole in the access panel.

The limited, free movement of the fasteners in their associated holes in an aircraft access panel presents a problem in access panels that are attached to the top and sides of an aircraft. When the access panel is removed from the top or side of an aircraft, the fasteners fall in odd positions due to gravity. This is not a problem on most of the access panels on the bottom of the aircraft as gravity pulls the fastener downward until the retaining ring engages against the interior surface of the access panel. Thus, gravity pulls fasteners on access panels on the bottom of the aircraft through their associated holes in the access panel and to their full-out positions relative to the access panel.

Substantially all aircraft use quick-release fasteners on access panels that cover frequently accessed areas of the aircraft. On some aircraft there could be ten or more access panels with hundreds of quick-release fasteners mounted on the access panels. Each of these fasteners has the potential to misalign with its associated fastener receptacle mounted on the structure of the aircraft, causing either damage to the fastener, damage to the access panel and/or damage to the sub-structure of the aircraft. Additionally, the misalignment of fasteners on their access panel presents a potential for a retaining ring of a fastener being knocked loose by contacting the sub-structure of the aircraft at an angle, with the retaining ring becoming a foreign object in an interior of the aircraft. Foreign object damage (FOD) is a real danger to aircraft as the foreign object can be sucked into engine intakes, or jam controls and cause electrical shorts if the loose retaining rings fall into the aircraft structure. All aircraft employing quick-release fasteners on their access panels are presented with the same problems with quick-release fastener removal and installation.

SUMMARY

The positioning clip of this disclosure is basically comprised of a top portion and a bottom portion that are molded together as one piece of a flexible, resilient plastic material. The positioning clip is configured and dimensioned to be manually, removably attached or clipped onto a fastener of a quick-release fastener assembly with the fastener in its full out position relative to the exterior surface of an access panel to which the fastener is attached. The clip attached to the fastener holds the fastener in its full out position relative to the exterior surface of the access panel.

The top portion of the positioning clip has a planar configuration with a top surface and an opposite bottom surface, and a forward edge and an opposite rearward edge.

A slot extends through the forward edge of the top portion of the positioning clip. The slot extends through the top portion of the positioning clip to a rear edge of the slot. The rear edge of the slot is spaced a distance from the rearward edge of the top portion of the positioning clip. The slot is configured to receive the fastener in the access panel in the slot with an enlarged portion of the fastener engaging against the top surface of the top portion of the positioning clip.

The bottom portion of the positioning clip has a planar configuration with a top surface and an opposite bottom surface, and with a forward edge and an opposite rearward edge. The forward edge of the bottom portion of the positioning clip is integrally formed with the forward edge of the top portion of the positioning clip. The slot extending through the forward edge of the top portion of the positioning clip also extends through the forward edge of the bottom portion of the positioning clip. The slot in the forward edge of the bottom portion of the positioning clip extends through the bottom portion of the positioning clip to a rearward edge of the slot. The rearward edge of the slot in the bottom portion of the positioning clip is spaced a distance from the rearward edge of the bottom portion of the positioning clip.

The top portion of the positioning clip and the bottom portion of the positioning clip have a V-shaped configuration in a plane that bisects the slot in the top portion of the positioning strip and the slot in the bottom portion of the positioning clip.

The connection between the top portion of the positioning clip and the bottom portion of the positioning clip is resilient, enabling the top portion of the positioning clip to move toward the bottom portion of the positioning clip in response to forces pushing the top portion of the positioning clip and the bottom portion of the positioning clip together. The resiliency of the connection also enables the top portion of the positioning clip and the bottom portion of the positioning clip to move apart when the forces are removed. The bottom surface of the bottom portion of the positioning clip is configured to engage against the access panel when the fastener in the access panel is received in the slots.

A plurality of the positioning clips can be connected to a flexible lanyard. For example, the number of the positioning clips connected to the flexible lanyard could correspond to the number of holes in an access panel that are occupied by quick-release fastener assemblies. With the plurality of positioning clips connected to the lanyard, the number of positioning clips used to position the fasteners of the quick-release fastener assemblies in the access panel to their full out positions can quickly be accounted for.

Additionally, an identification tag could be connected to the lanyard. The identification tag would have information on the number of positioning clips connected to the particular lanyard and identify the access panel with which the positioning clips on the lanyard are used.

In use of the positioning clip, the positioning clip ensures that the fastener of a quick-release fastener system is held in its full out position relative to the exterior surface of an aircraft access panel. The positioning clip maintains the fastener in a perpendicular orientation relative to the exterior surface of the access panel and relative to its associated receptacle in the substructure of the aircraft to which the access panel is to be attached.

The positioning clip is scalable to fit all types of quick-release fasteners used in the aircraft/aerospace industry. The positioning clip is made of mar resistant and resilient material that prevents damage to the access panels surface finish. The positioning clip is designed with an eyelet on one end to allow the positioning clip to be connected to a flexible lanyard. A plurality of positioning clip can be connected to the lanyard, with the number of positioning clips corresponding to the number of fastener holes in the access panel with which the positioning clips are to be used. The positioning clips can also have an information tag that indicates which access panel the plurality of positioning clips are to be used, and the exact number of positioning clips that the access panel requires. This makes the positioning clips easily accounted for and reduces the chance of a positioning clip becoming a FOD hazard.

Additionally, the cross-section profile of the positioning clip enables the positioning clips to be easily mass produced via an extrusion process. The light upward spring tension of the positioning clip on the fastener holds the fastener retaining ring tight against and parallel to the interior surface of the access panel, eliminating the chance that the retainer ring of the fastener could come dislodged from the fastener due to contacting the panel at an angle.

The features, functions and advantages that have been discussed can be achieved independently in various embodiments or may be combined in yet other embodiments, further details of which can be seen with reference to the following description and drawings.

DETAILED DESCRIPTION

Figure 1:
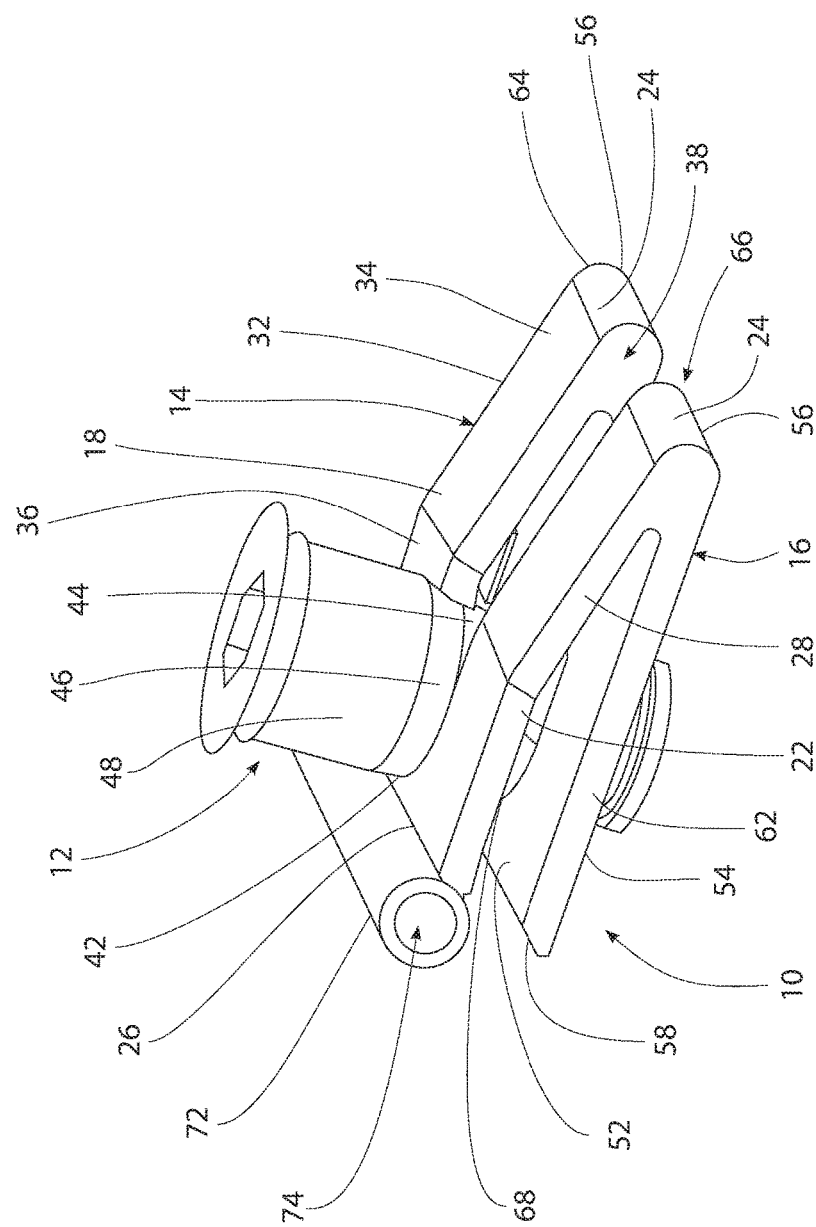
FIG. 1 is a representation of a perspective view of a positioning clip removably attached to a fastener of a quick-release fastener system.
Figure 2:
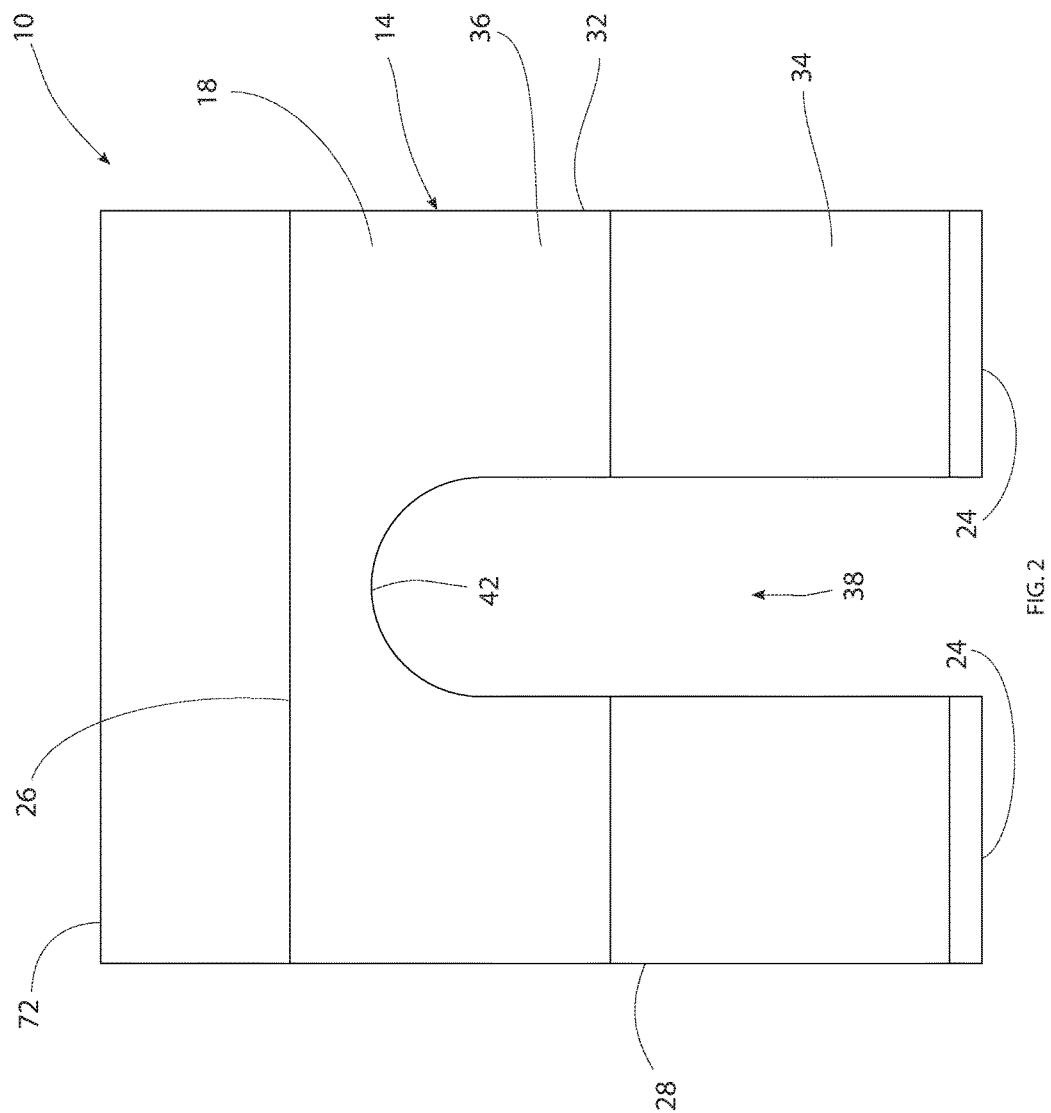
FIG. 2 is a representation of a top plan view of the positioning clip.
Figure 3:
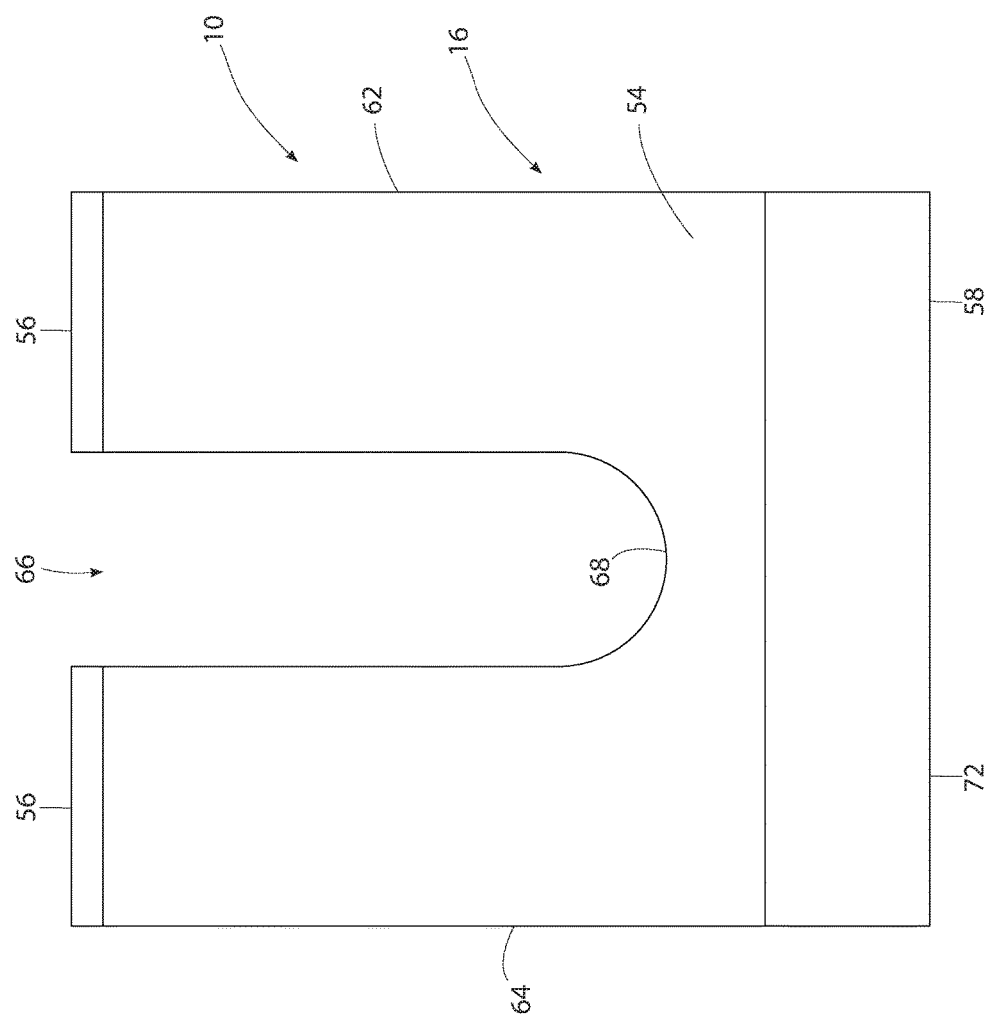
FIG. 3 is a representation of a bottom plan view of the positioning clip.
Figure 4:
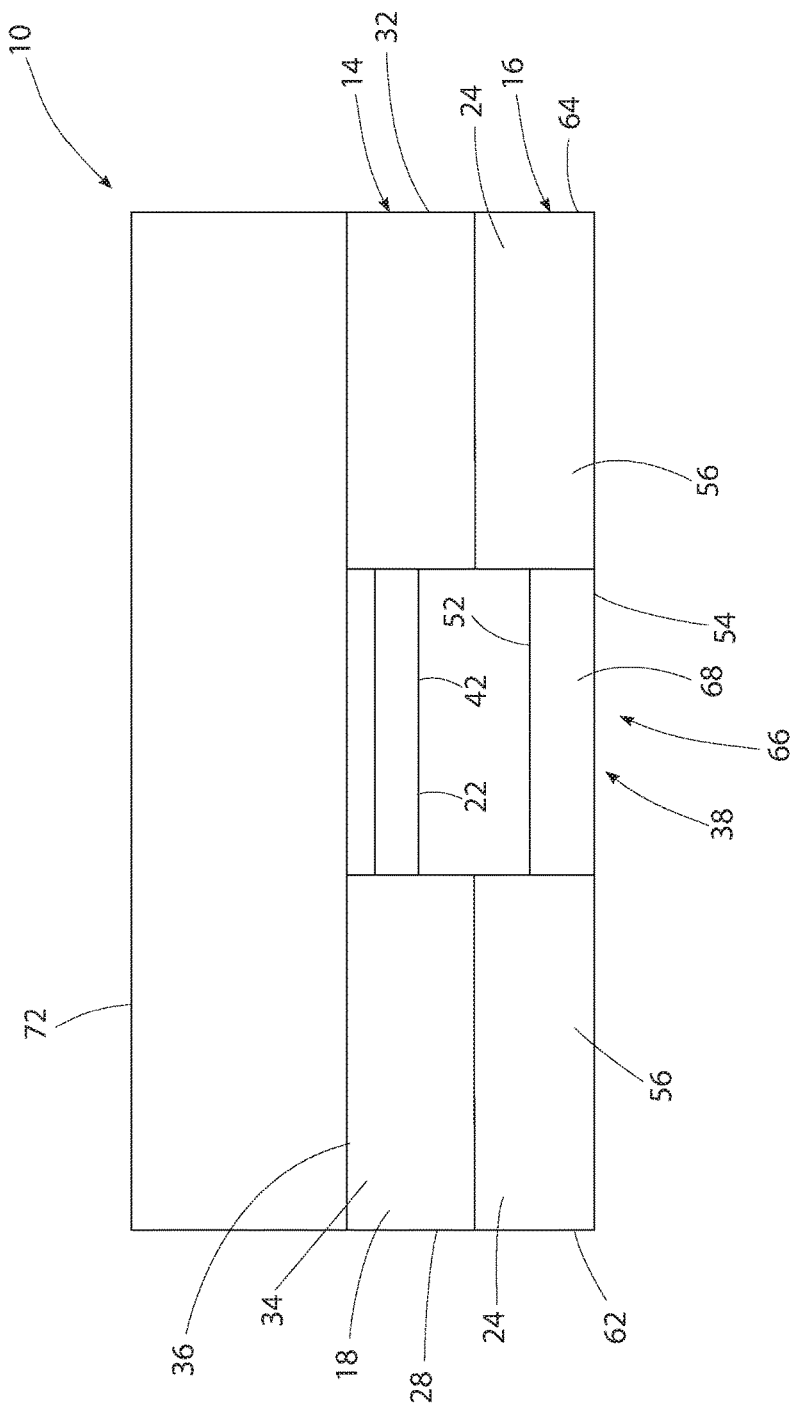
FIG. 4 is a representation of a front elevation view of the positioning clip.
Figure 5:
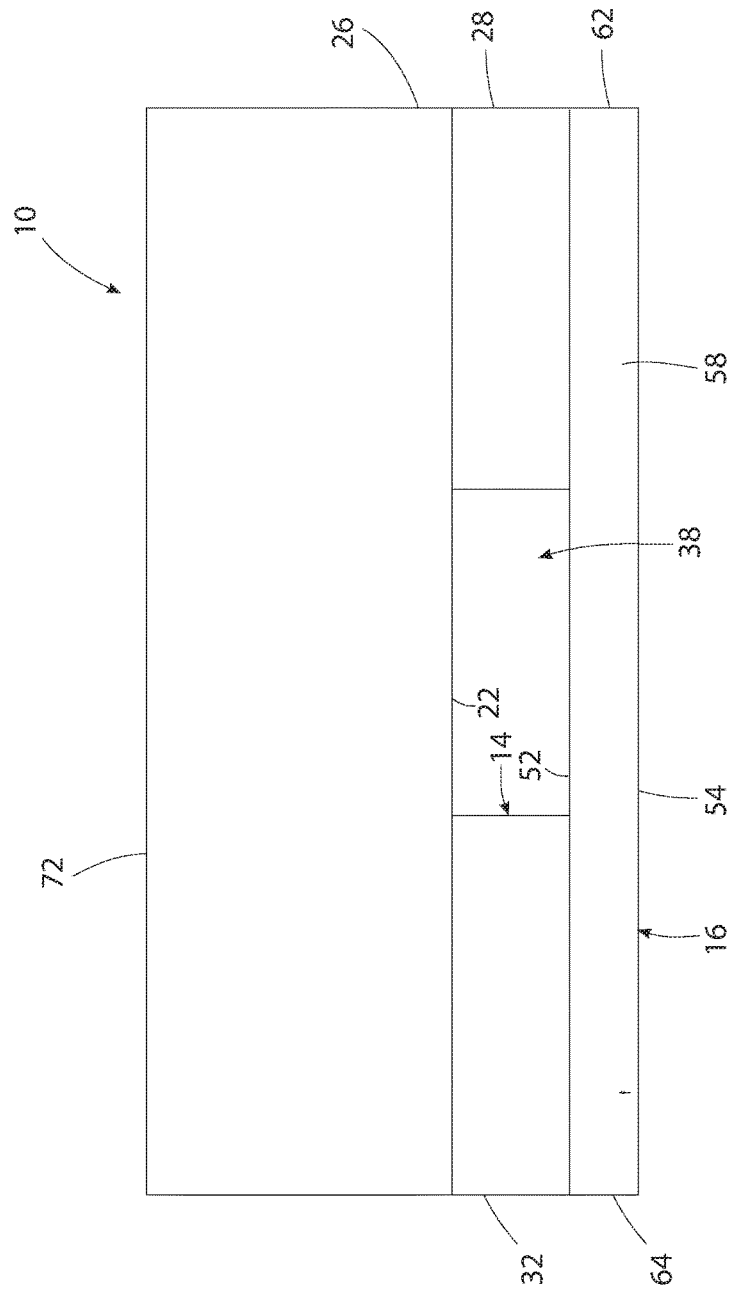
FIG. 5 is a representation of a rear elevation view of the positioning clip.
Figure 6:
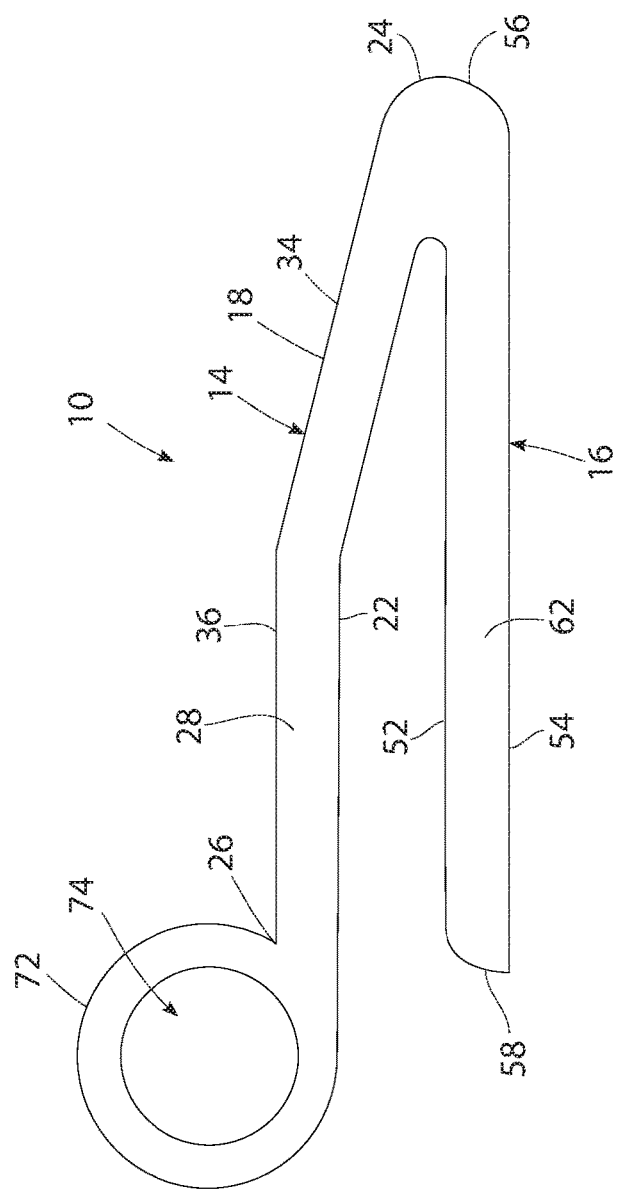
FIG. 6 is a representation of a left side elevation view of the positioning clip.
Figure 7:
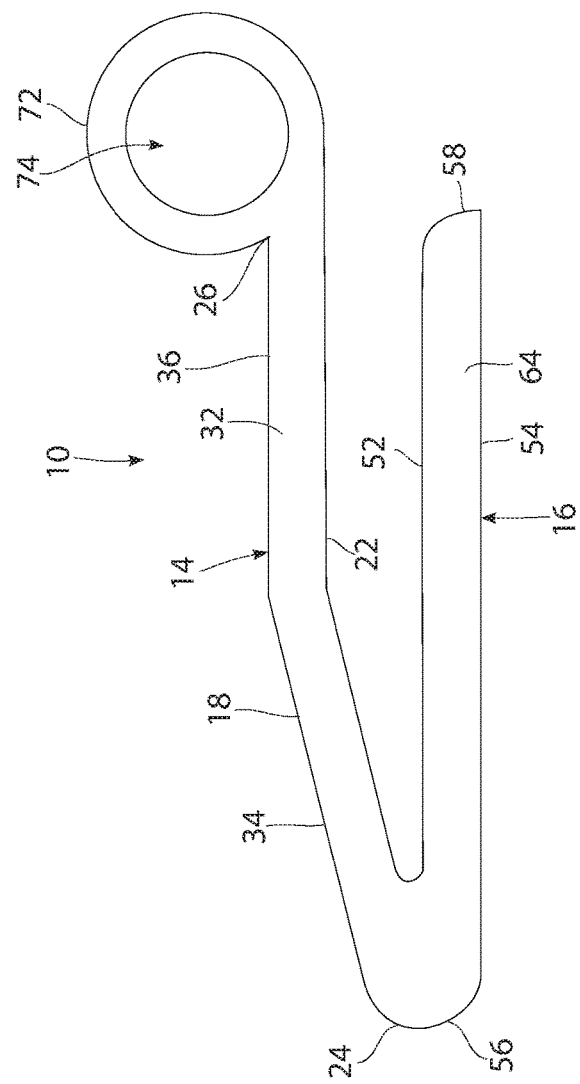
FIG. 7 is a representation of a right side elevation view of the positioning clip.

FIG. 1 is a representation of the positioning clip 10 of this disclosure removably attached to a fastener 12 that is removably attachable to a receptacle of a quick-release panel fastener system. Examples of quick-release access panel fastener systems are the Milson® panel fastener system or the Camloc® panel fastener system, to name only a few. The positioning clip 10 of this disclosure is designed to be removably attachable to a fastener of substantially any quick release panel fastener system.

The positioning clip 10 is basically comprised of a top portion 14 and a bottom portion 16. The top portion 14 and bottom portion 16 are molded of a flexible, resilient plastic material. As represented in FIG. 1, the positioning clip 10 is dimensioned to be manually, removably clipped to or pressed onto the fastener 12 of a quick-release fastener assembly.

As represented in FIG. 1, the top portion 14 of the positioning clip 10 has a general rectangular and planar configuration with a top surface and an opposite bottom surface 22, a forward edge 24 and an opposite rearward edge 26, and the left side surface 28 extending between the forward edge 24 and the rearward edge 26 and an opposite right side surface 32 extending between the forward edge 24 and the rearward edge 26. The thickness of the top portion 14 is substantially constant throughout the area of the top portion. The top portion 14 has an inclined section 34 that extends upwardly and away from the forward edge 24 as represented in FIG. 1. The top portion 14 also has a level section 36 that is connected integrally with the inclined section 34 along a straight line. The level section 36 extends from the inclined section 34, parallel with the bottom portion 16 of the positioning clip 10, to the rearward edge 26 of the top portion 14.

A slot 38 extends through the top portion 14. The slot 38 extends through the forward edge 24 of the top portion 14 and through the top portion to a rearward edge 40 of the slot. The rearward edge 40 of the slot 38 is spaced from and does not intersect with the rearward edge 26 of the top portion 14. The rearward edge 40 of the slot 38 has a general semi-circular configuration. The rearward edge 40 of the slot also has a slight beveled surface configuration 42 at the top of the rearward edge. The rearward edge 40 is dimensioned to fit snug around a narrow diameter portion 44 of the fastener 12 just below a tapered surface 46 of the fastener that extends to an enlarged portion 48 of the fastener. The beveled surface configuration 42 at the top of the rearward edge 40 engages with the tapered surface 46 of the fastener 12. The dimensioning of the semi-circular configuration and the beveled surface configuration 42 of the slot rearward edge 40 enables the top portion 14 of the positioning clip 10 to fit snug around and removably attach to the narrow diameter portion 44 of the fastener 12. With the positioning clip 10 removably attached to a fastener 12 on an access panel, the fastener will be held by the positioning clip 10 in its full out position relative to the access panel when the access panel is moved from a horizontal orientation to a vertical orientation, for example when the access panel is attached to a side of an aircraft. Additionally, vibration from removing and/or installing the access panel will not dislodge the positioning clip 10 from the fastener 12.

As represented in FIG. 1, the bottom portion 16 of the positioning clip 10 also has a general rectangular and planar configuration that is similar to that of the top portion 14. The bottom portion 16 has a top surface 52 and an opposite bottom surface 54, a forward edge 56 and an opposite rearward edge 58, and a left side edge 62 and an opposite right side edge 64. The bottom portion 16 has a thickness that is substantially constant throughout the area of the bottom portion. Unlike the top portion 14, the bottom portion 16 is substantially flat and does not include an inclined section. The forward edge 56 of the bottom portion 16 is integrally connected with the forward edge 24 of the top portion 14.

A slot 66 is formed in the bottom portion 16. The slot 66 of the bottom portion 16 has substantially the same configuration as the slot 38 in the top portion 14. The slot 66 in the bottom portion 16 extends through the forward edge 56 of the bottom portion and through the bottom portion to a rearward edge 66 of the slot. The rearward edge 68 of the slot 66 is spaced from and does not intersect the rearward edge 58 of the bottom portion 16. The rearward edge 68 of the slot 66 in the bottom portion 16 has a semi-circular configuration and is dimensioned substantially the same as the slot rearward edge 42 of the top portion 14. This enables the slot 68 in the bottom portion 16 to engage snug around and removably attach to the narrow diameter portion 44 of the fastener 12 in the same manner as the slot 38 of the top portion 14.

The inclined section 34 of the top portion 14 causes the top portion 14 to angle away from the bottom portion 16 as the top portion 14 extends from its forward edge 24 to its rearward edge 26 and the bottom portion 16 extends from its forward edge 56 to its rearward edge 58. This gives the positioning clip 10 a general V-shaped cross-section configuration in a plane that extends through the slot 38 of the top portion 14 and the slot of the bottom portion 16.

The positioning clip 10 is also formed with a connection 72 for a lanyard 76. The connection 72 for the lanyard 76 is formed as an eyelet or a cylindrical tube that extends across the rearward edge 26 of the top portion 14. The connection tube 72 is formed with an interior bore 74 that is dimensioned to receive the lanyard 76 inserted through the bore 74. Furthermore, the interior bore 74 can be dimensioned to enable the connection tube 72 to easily slide over the length of the lanyard 76 to move the positioning clip 10 to a desired position on the lanyard.

Figure 8:
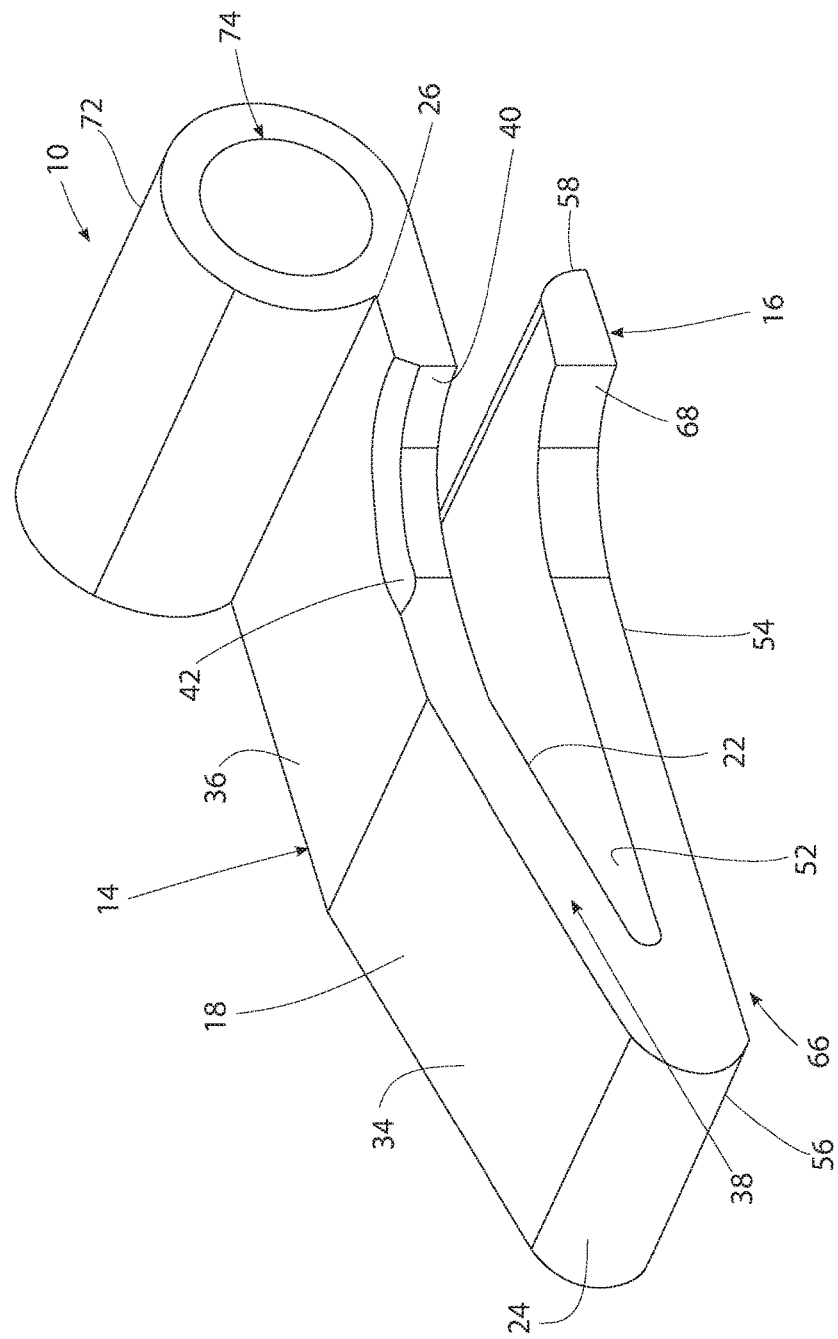
FIG. 8 is a representation of a perspective view of a cross-section view of the positioning clip.

FIG. 8 is a representation of a plurality of the positioning clips 10 connected to a lanyard 76. As represented in FIG. 8, the lanyard 76 is threaded through the interior bore 74 of each tubular connection 72 of the positioning clips 10. The number of positioning clips 10 on the lanyard 76 corresponds to the number of quick-release fastener system holes 78 in an access panel 82 that are occupied by a quick-release fastener assembly. With the plurality of positioning clips 10 connected to the lanyard 76, the number of positioning clips used to position the fasteners 12 of the quick-release fastener assemblies in the access panel 82 to the full out positions can quickly be accounted for.

Figure 9:
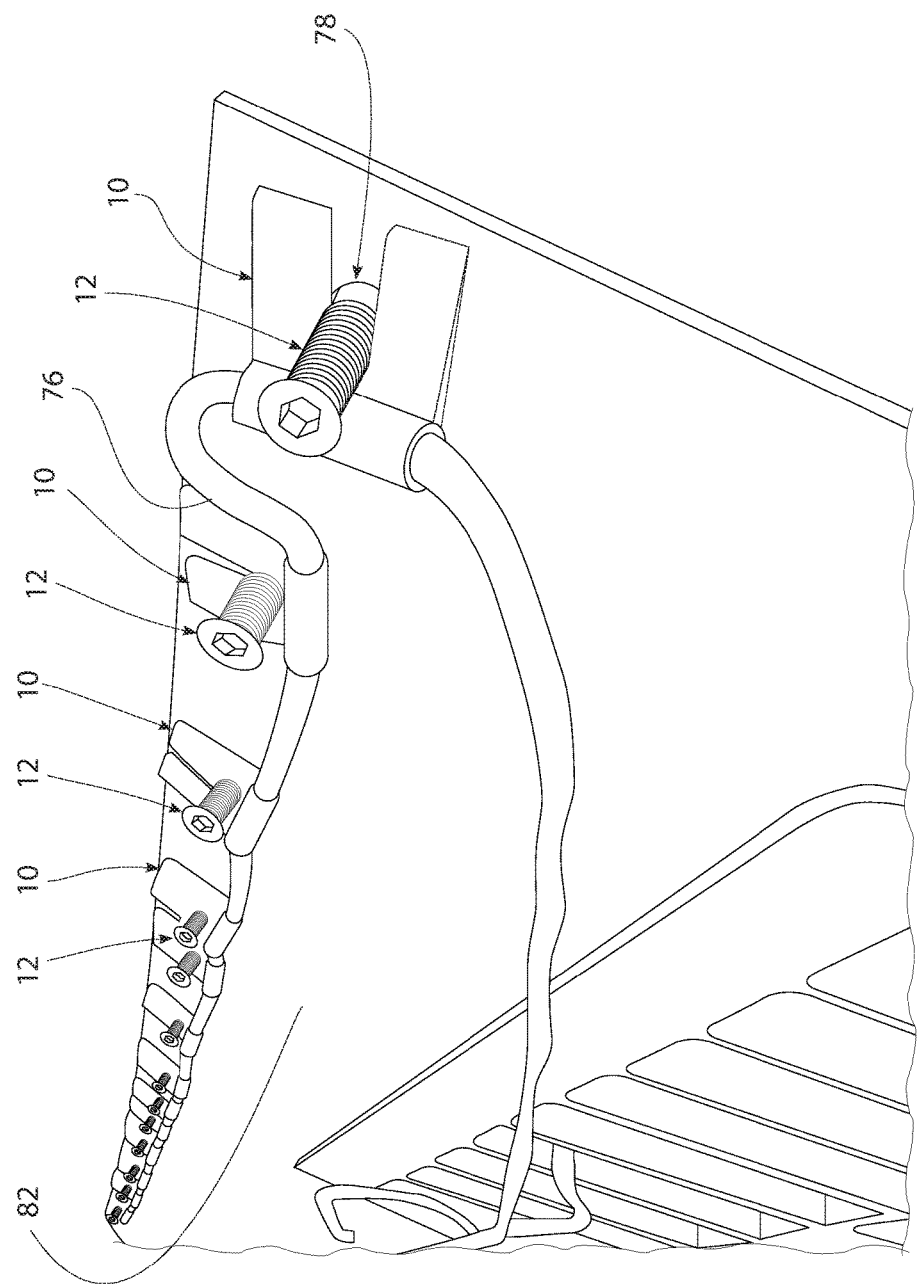
FIG. 9 is a representation of several of the positioning clips installed on the exterior surface of an access panel and holding fasteners in their full out positions on the access panel.
Figure 10:
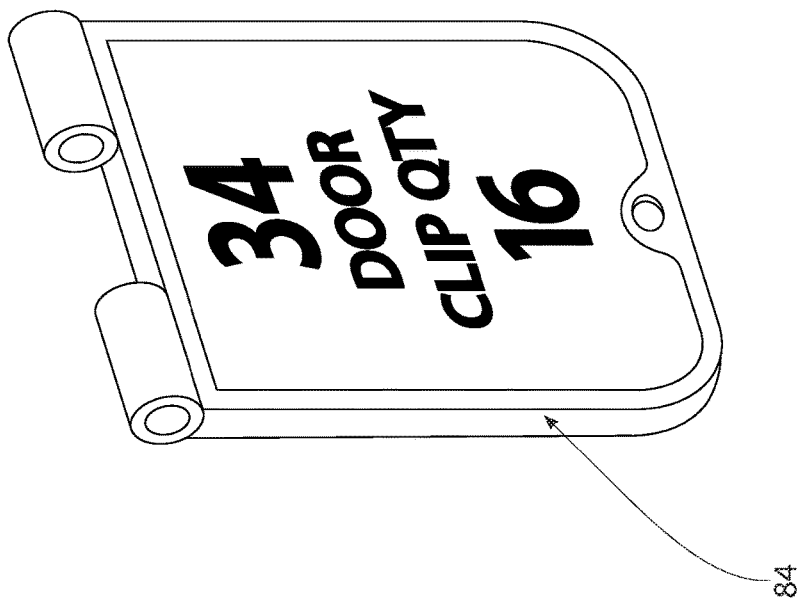
FIG. 10 is a representation of an information tag used with the positioning clip.

Additionally, an identification tag 84 such as that represented in FIG. 9 could be connected to the lanyard 76. The identification tag 84 would have information on the number of positioning clips 10 connected to the particular lanyard 76 and identify the access panel 82 with which the positioning clips on the lanyard are used. As represented in FIG. 9, the identification tag 84 identifies positioning clips and a lanyard that are associated with a door or access panel identified as access panel 34. The identification tag 84 also sets forth that there are 16 positioning clips on the lanyard associated with access panel 34.

FIGS. 1 and 8 represent use of a positioning clip 10 on a fastener 12 of a quick-release fastener assembly to push the fastener 12 to its full out position relative to an access panel 82. As represented in FIGS. 1 and 8, the fastener 12 is first manually moved to its full out position relative to the access panel 82. The positioning clip 10 is then positioned relative to the fastener 12 where the narrow diameter portion 44 of the fastener is adjacent the forward edge 24 of the top portion 14 of the positioning clip and the forward edge 56 of the bottom portion 16 of the positioning clip. The bottom surface 54 of the bottom portion 16 of the positioning clip 10 is positioned on the exterior surface of the access panel 82. A manual force is then exerted on the top portion 14 of the positioning clip 10, for example in the area of the lanyard connection 72. This causes the top portion 14 and bottom portion 16 of the positioning clip 10 to be squeezed together. The positioning clip 10 is then manually moved toward the fastener 12, causing the narrow diameter portion 44 of the fastener to move through the slot 38 in the top portion 14 of the positioning clip 10 and through the slot 66 of the bottom portion 16 of the positioning clip 10. The positioning clip 10 is continued to be moved toward the fastener 16 until the narrow diameter portion 44 of the fastener engages against the slot rearward edge 42 of the top portion 14 of the positioning clip 10 and the slot rearward edge 68 of the bottom portion 16 of the positioning clip. The force moving the top portion 14 and bottom portion 16 together is then removed and the resiliency of the positioning clip causes the top portion 14 to move upward relative to the fastener 12 until the top surface 18 of the top portion engages against the tapered surface 46 or enlarged portion 48 of the fastener. This results in the positioning clip 10 pushing the fastener 12 to its full out position relative to the access panel 82. The lanyard 76 connected to the plurality of positioning clips 10 provides a system that accounts for the plurality of positioning clips removably connected to the fasteners 12 of a particular aircraft access panel 82. Represented in FIG. 9 is an access panel 82 with a plurality of quick release fasteners 12 on the access panel. The plurality of positioning clips 10 connected by the lanyard 76 are removably attached to the plurality of fasteners 12 with each positioning clip holding a fastener to which the positioning clip is attached in an extended position of the fastener from the aircraft access panel 82. The lanyard 76 connected to each of the positioning clips 10 is operable to account for each positioning clip of the plurality of positioning clips and ensure that none of the positioning clips of the plurality of positioning clips can be removed from their associated fastener without an accounting of the positioning clip removed from its associated fastener. The lanyard 76 connected to each of the positioning clips 10 is also operable to account for the plurality of fasteners 12 connected to the access panel 82 to ensure that none of the fasteners 12 can be removed from the access panel 82 without an accounting of the fastener removed from the access panel. Thus, the lanyard 76 is operable to make sure that none of the positioning clips 10 and none of the fasteners 12 are lost from the access panel 82 and into the structure of the aircraft and thereby prevents the positioning clips 10 and fasteners 12 from causing foreign object damage in the structure of the aircraft. The positioning clip 10 holds the fastener 12 in its full out position relative to the access panel 82, enabling the access panel to be positioned on the aircraft with each of the fasteners 12 aligned with their associated receptacles on the aircraft structure. Each of the positioning clips 10 can then be removed from its associated fastener 12, and the lanyard 76 with its connected positioning clips 10 can be removed from the access panel. The number of positioning clips 10 can then be accounted for. The fasteners 12 can then be attached to their associated receptacles, completing the reattachment of the access panel 82 to the aircraft.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A system for retaining quick release fasteners in an aircraft access panel, the system comprising:
a plurality of positioning clips each removably attachable to a corresponding quick release fastener of the aircraft access panel, each positioning clip having a top portion, the top portion being configured to be attached to and hold the corresponding fastener in an extended position with respect to the aircraft access panel; each positioning clip having a bottom portion, the bottom portion being connected to the top portion of the positioning clip, the bottom portion being configured to engage against the aircraft access panel when the top portion of the positioning clip is attached to the corresponding fastener of the aircraft access panel, the top portion and the bottom portion being resilient and enabling the top portion to move toward the bottom portion in response to forces pushing the top portion and the bottom portion together and enabling the top portion and the bottom portion to move apart when the forces pushing the top portion and the bottom portion together are removed from the top portion and the bottom portion, and,
a lanyard connected to the plurality of positioning clips, the lanyard being operable to ensure that none of the positioning clips are unaccounted for with respect to the aircraft access panel.

2. A system for retaining quick release fasteners in an aircraft access panel, the system comprising:
a plurality of positioning clips each removably attachable to a corresponding quick release fastener of the aircraft access panel, each positioning clip being configured to hold the corresponding fastener in an extended position with respect to the aircraft access panel; and,
each positioning clip having a top portion of the positioning clip, the top portion having a top surface and an opposite bottom surface;
each positioning clip having a slot in the top portion of the positioning clip, the slot being configured to receive a fastener in the aircraft access panel in the slot with an enlarged portion of the fastener engaging against the top surface of the top portion of the positioning clip;
each positioning clip having a bottom portion of the positioning clip, the bottom portion having a connection to the top portion with the bottom portion projecting from the bottom surface of the top portion;
a lanyard connected to the plurality of positioning clips, the lanyard being operable to ensure that none of the positioning clips are unaccounted for with respect to the aircraft access panel; and,
the top portion and the bottom portion being resilient enabling the top portion to move toward the bottom portion in response to forces pushing the top portion and the bottom portion together and enabling the top portion and the bottom portion to move apart when the forces pushing the top portion and the bottom portion are removed from the top portion and the bottom portion, the bottom portion being configured to engage against the aircraft access panel when a fastener in the aircraft access panel is received in the slot.

3. The system of claim 2, further comprising:
the lanyard having a flexible length; and,
the lanyard connection to the plurality of positioning clips being configured for movement of the plurality of positioning clips along the flexible length of the lanyard.

4. The system of claim 2, further comprising:
the lanyard being connected to an identification tag.

5. The system of claim 4, further comprising:
the identification tag identifying a number of the positioning clips to which the lanyard is connected.

6. The system of claim 5, further comprising:
the identification tag identifying the aircraft access panel with which the system is used.

7. The system of claim 2, further comprising:
the top portion of each positioning clip having a forward edge and an opposite rearward edge; and,
the slot extending through the forward edge and across the top portion of the positioning clip and ending short of and not extending through the rearward edge.

8. The system of claim 7, further comprising:
the connection of the bottom portion of each positioning clip to the top portion of the positioning clip being along the forward edge of the top portion of the positioning clip with the bottom portion of the positioning clip projecting from the forward edge of the top portion of the positioning clip.

9. The system of claim 8, further comprising:
the top portion of each positioning clip and the bottom portion of the positioning clip having a V-shaped cross-section configuration in a plane that bisects the slot.

10. The system of claim 8, further comprising:
the top portion of each positioning clip having an inclined section that extends at an angle relative to the bottom portion as the inclined section extends away from the forward edge of the top portion of the positioning clip; and,
the top portion of each positioning clip having a level section that extends from the inclined section parallel to the bottom portion as the level section extends away from the inclined section of the top portion of the positioning clip.

11. The positioning clip of claim 2, further comprising:
the bottom portion of each positioning clip having a forward edge and an opposite rearward edge; and,
a bottom slot in the bottom portion of each positioning clip, the bottom slot extending through the forward edge of the bottom portion of the positioning clip and across the bottom portion of the positioning clip and ending short of and not extending through the rearward edge of the bottom portion of the positioning clip, the bottom slot being configured to receive a fastener in the aircraft access panel in the bottom slot with an enlarged portion of the fastener engaging against the top surface of the top portion of the positioning clip.

12. An aircraft access panel comprising:
a plurality of fasteners retained within holes extending through the aircraft access panel;
a plurality of positioning clips removably attached to corresponding ones of the plurality of fasteners, the plurality of positioning clips having top portions that are removably attached to the corresponding ones of the plurality of fasteners, the positioning clips being operable to retain the corresponding fasteners in extended positions with respect to the aircraft access panel;
the plurality of positioning clips having bottom portions, the bottom portions being connected to the top portions of the plurality of positioning clips, the bottom portions being configured to engage against the aircraft access panel when the top portions of the positioning clips are removably attached to the corresponding ones of the plurality of fasteners;
the top portions and the bottom portions of the positioning clips being resilient and enabling the top portions of the positioning clips to move toward the bottom portions of the positioning clips in response to forces pushing the top portions of the positioning clips and the bottom portions of the positioning clips together and enabling the top portions of the positioning clips and the bottom portions of the positioning clips to move apart when the forces are removed; and,
a lanyard connected to the plurality of positioning clips, the lanyard being operable to ensure that none of the positioning clips and none of the fasteners of the plurality of fasteners are unaccounted for with respect to the aircraft access panel.

13. An aircraft access panel comprising:
a plurality of fasteners retained within holes extending through the aircraft access panel;
a plurality of positioning clips removably attached to corresponding ones of the plurality of fasteners, the positioning clips being operable to retain the corresponding fasteners in extended positions with respect to the aircraft access panel;
each positioning clip of the plurality of positioning clips having a top portion of the positioning clip, the top portion having a planar configuration with a top surface and an opposite bottom surface and a forward edge and an opposite rearward edge;
each positioning clip of the plurality of positioning clips having a slot in the top portion of the positioning clip, the slot extending through the forward edge of the top portion and through the top portion of the positioning clip to a rear edge of the slot that is spaced a distance from the rearward edge of the top portion of the positioning clip, the slot being configured to receive a fastener in the aircraft access panel in the slot with an enlarged portion of the fastener engaging against the top surface of the top portion of the positioning clip;
each positioning clip of the plurality of positioning clips having a bottom portion of the positioning clip, the bottom portion of the positioning clip having a planar configuration with a top surface and an opposite bottom surface and with a forward edge and an opposite rearward edge, the forward edge of the bottom portion of the positioning clip being formed integrally with the forward edge of the top portion of the positioning clip connecting the top portion of the positioning clip and the bottom portion of the positioning clip as one piece;
a lanyard connected to the plurality of positioning clips, the lanyard being operable to ensure that none of the positioning clips and none of the fasteners of the plurality of fasteners are unaccounted for with respect to the aircraft access panel; and,
the top portion and the bottom portion of the positioning clip being resilient and enabling the top portion of the positioning clip to move toward the bottom portion of the positioning clip in response to forces pushing the top portion of the positioning clip and the bottom portion of the positioning clip together and enabling the top portion of the positioning clip and the bottom portion of the positioning clip to move apart when the forces are removed, the bottom surface of the bottom portion of the positioning clip being configured to engage against the aircraft access panel when a fastener in the aircraft access panel is received in the slot.

14. The aircraft access panel of claim 13, further comprising:
the lanyard having a flexible length; and,
the lanyard connection to the plurality of positioning clips being configured for movement of the plurality of positioning clips along the flexible length of the lanyard.

15. The aircraft access panel of claim 13, further comprising:
the lanyard being connected to an identification tag.

16. The aircraft access panel of claim 15, further comprising:
the identification tag identifying a number of positioning clips to which the lanyard is connected.

17. The aircraft access panel of claim 16, further comprising:
the identification tag identifying the aircraft access panel.

18. The aircraft access panel of claim 13, further comprising:
the top portion of each positioning clip having an inclined section that extends at an angle relative to the bottom portion as the inclined section extends away from the forward edge of the top portion of the positioning clip; and,
the top portion of the positioning clip having a level section that extends from the inclined section parallel to the bottom portion of the positioning clip as the level section extends away from the inclined section of the top portion of the positioning clip.

19. A method of accounting for a plurality of positioning clips that ensure full out positioning of quick release fasteners in fastener holes of an aircraft access panel, the method comprising:
providing a lanyard connected to a plurality of positioning clips;
inserting each positioning clip of the plurality of positioning clips between an enlarged portion of each quick release fastener and a surface of the aircraft access panel adjacent a fastener hole of the quick release fastener with a resiliency of the positioning clip urging the enlarged portion of the quick release fastener away from the surface of the access panel.

20. The method of claim 19, further comprising:
positioning the quick release fastener in a slot in the positioning clip with a top surface of a top portion of the positioning clip engaging against the enlarged portion of the quick release fastener and with a bottom surface of a bottom portion of the positioning clip engaging against the surface of the aircraft access panel adjacent the fastener hole.

* * * * *